United States Patent
Mayer et al.

(10) Patent No.: US 8,802,249 B2
(45) Date of Patent: Aug. 12, 2014

(54) CELLULAR FUSIBLE LINK AND BATTERY MODULE CONFIGURATION

(75) Inventors: Steven Anthony Mayer, Lafayette, CO (US); Kyle William Butterfield, Boulder, CO (US)

(73) Assignee: Eetrex, Inc., Boulder, CO (US)

( * ) Notice: Subject to any disclaimer, the term of this patent is extended or adjusted under 35 U.S.C. 154(b) by 0 days.

(21) Appl. No.: 13/495,828

(22) Filed: Jun. 13, 2012

(65) Prior Publication Data

US 2013/0337291 A1 Dec. 19, 2013

(51) Int. Cl.
*H01M 2/34* (2006.01)
*H01M 2/30* (2006.01)
*H01M 2/00* (2006.01)

(52) U.S. Cl.
USPC .......................................................... 429/7

(58) Field of Classification Search
USPC .......................................................... 429/7
See application file for complete search history.

(56) References Cited

U.S. PATENT DOCUMENTS

2009/0297892 A1* 12/2009 Ijaz et al. ..................... 429/7

* cited by examiner

*Primary Examiner* — Milton I Cano
*Assistant Examiner* — Michael Dignan
(74) *Attorney, Agent, or Firm* — Polsinelli PC

(57) ABSTRACT

Implementations described and claimed herein provide a battery unit having a first plurality of cells oriented in a first direction and a second plurality of cells oriented in a second direction. The first plurality of cells have a corresponding first plurality of terminals with a first polarity, and the second plurality of cells have a corresponding second plurality of terminals having a second polarity that is an opposite polarity of the first polarity. A conducting surface electrically connects the first and second pluralities of terminals and has a plurality of fuses, each fuse associated with one of the second plurality of terminals. Each fuse has an elongated perforation defining an enclosed surface having a resistive aperture. In general, each resistive aperture is oriented relative to resistive apertures of at least one adjacent fuse such that a substantially even current path is provided to each of the second plurality of terminals.

8 Claims, 6 Drawing Sheets

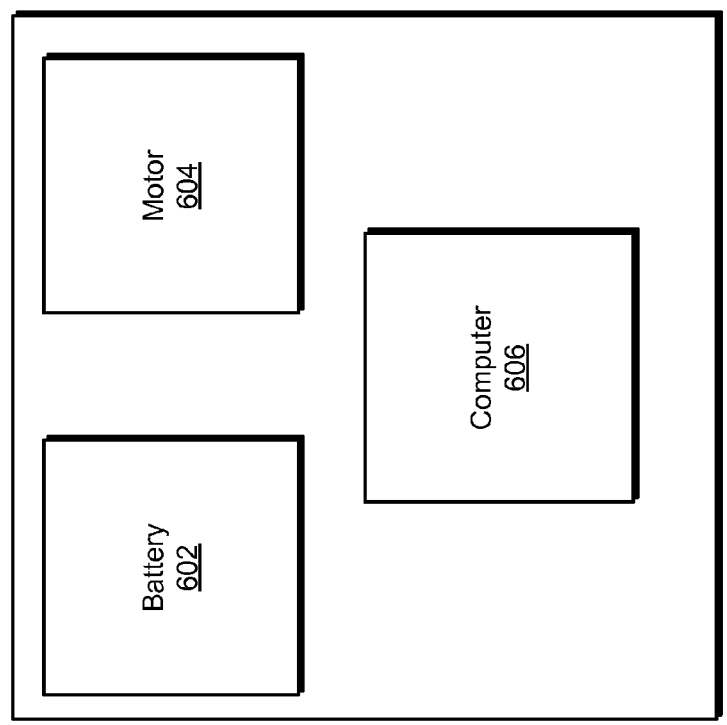

CELLULAR FUSIBLE LINK AND BATTERY MODULE CONFIGURATION

TECHNICAL FIELD

Aspects of the present disclosure involve a cellular fusible link and more particularly involve a battery module configuration having cellular fusible links.

BACKGROUND

Large, complex battery systems provide high voltage and power for a variety of modern uses, including, but not limited to, electric vehicles, hybrid vehicles, backup power supplies for computing centers, homes, and neighborhoods, and power storage for alternative energy generation platforms. Such battery systems generally include one or more cells in parallel that may be connected in series configurations to provide higher voltage and power. Regardless of the configuration, however, cells and modules are susceptible to failure for a variety of reasons. For example, if the temperature of a cell exceeds the upper limit of the functional temperature range of the cell, the pressure from the high temperature may cause a cell to burst, may increase shorts, and can even cause a fire. Further, an internal short in one of the cells may result in thermal runaway, which occurs when an increase in temperature increases the current through the cell, resulting in a further increase in temperature until the cell fails. Failure of one cell often triggers a similar failure in adjacent cells.

It is with these and other issues in mind that various aspects of the present disclosure were developed.

SUMMARY

Implementations described and claimed herein address the foregoing problems by providing a battery unit having a first plurality of cells oriented in a first direction and a second plurality of cells oriented in a second direction. The first plurality of cells have a corresponding first plurality of terminals with a first polarity, and the second plurality of cells have a corresponding second plurality of terminals having a second polarity that is an opposite polarity of the first polarity. The first plurality of terminals are positioned relative to the second plurality of terminals such that the first plurality of terminals and the second plurality of terminals may be electrically connected to a conducting surface. The conducting surface has a plurality of fuses, each fuse associated with one of the second plurality of terminals. Each fuse has an elongated perforation that defines an enclosed surface having a resistive aperture (fusible link). In general, each resistive aperture is oriented relative to resistive apertures of at least one other adjacent fuse such that a substantially even current path is provided to each of the second plurality of terminals.

Other implementations are also described and recited herein.

BRIEF DESCRIPTION OF THE DRAWINGS

Example embodiments are illustrated in referenced figures of the drawings. It is intended that the embodiments and figures disclosed herein are to be considered illustrative rather than limiting.

FIG. 1A illustrates a detailed view of a cell and corresponding fusible link from FIG. 1;

FIG. 6 illustrates an example vehicle system that may be useful in implementing the presently disclosed technology.

DETAILED DESCRIPTION

Aspects of the presently disclosed technology involve a battery system including one or more modules connected in series configurations to provide higher voltage and power, each module having one or more cells connected in parallel. In general, excessive current flow through and particularly from one cell often results in the failure of that cell, sometimes catastrophically. For example, if the temperature of a cell exceeds the upper limit of the functional range of the cell or the cell experiences a short, the cell may fail. Moreover, excessively high currents can cause failures or malfunction of related systems. In one example, failure of one cell often triggers a similar failure in adjacent cells, which may impair the operation of the battery system or render it inoperative. Accordingly, the presently disclosed technology provides a battery module configuration and fusible links at the cell level, sometimes referred to as cellular fusible links, to isolate failed cells from adjacent cells. Aspects of the presently disclosed technology provide a fuse associated with a terminal, such as a negative terminal, of each cell of the same polarity, wherein the fuse blows to isolate the cell when the current through the fuse exceeds a threshold discharge corresponding to one cell.

Figure 1:
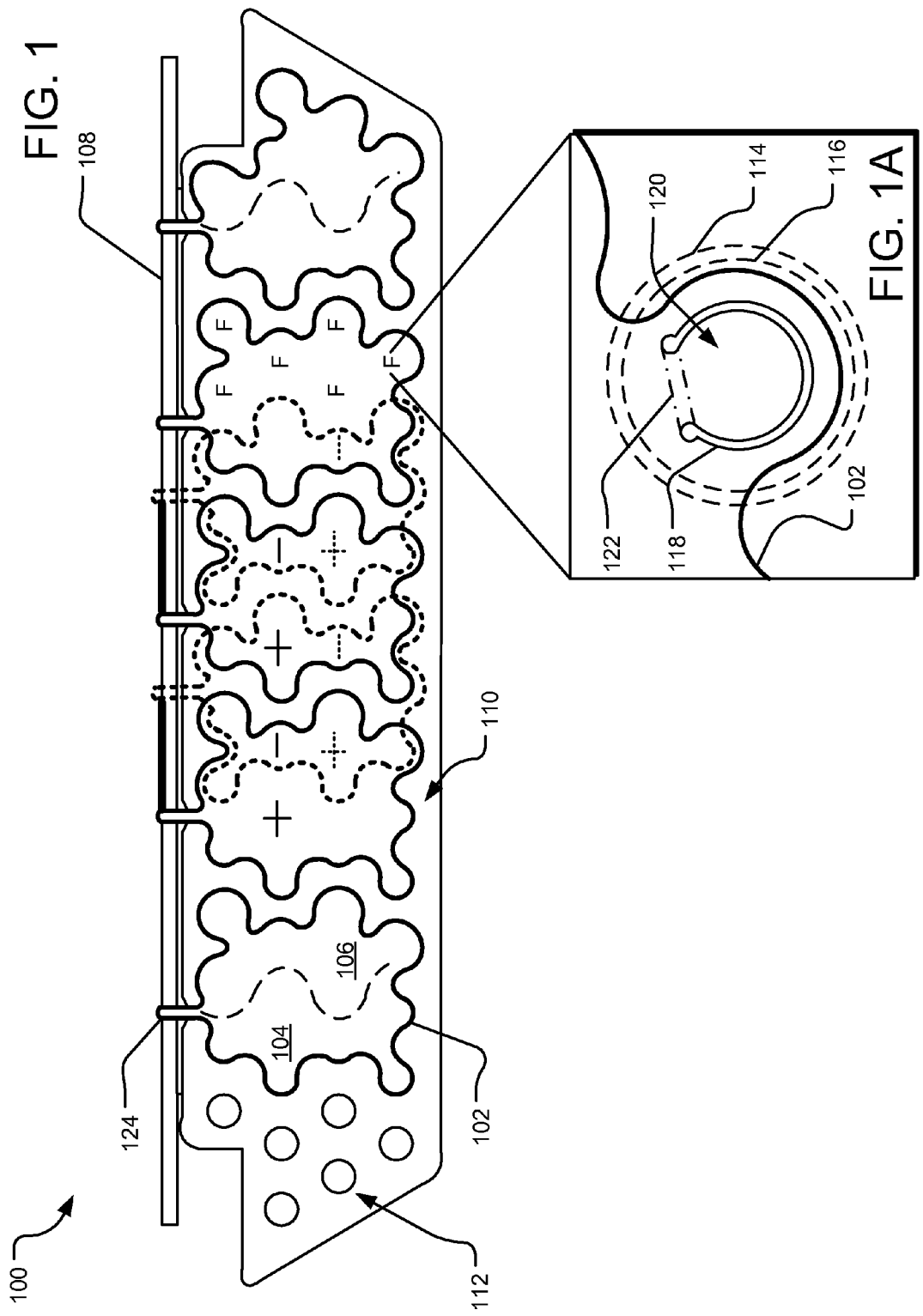
FIG. 1 illustrates a side view of an example battery unit having fusible links.

FIG. 1 illustrates a side view of an example battery unit 100 having fusible links. The battery unit 100 may be used in a variety of systems, including, but not limited to, electric vehicles, hybrid vehicles, backup power supplies for computing centers, homes, and neighborhoods, and power storage for alternative energy generation platforms. The battery unit 100 includes a plurality of modules 104 and 106 involving one or more cells 114 stacked in parallel. The battery unit 100 may be connected to additional battery units in series to provide higher voltage and power. A battery system includes one or more of the battery units 100. In one very particular exemplary implementation used to illustrate the various concepts described herein, a battery system provides approximately 330 Volts, with each of the battery units 100 in the battery system providing approximately 36 Volts and each cell 114 providing 3.25 to 3.8 Volts. However, other battery unit arrangements, cell types, and cell voltages are contemplated. A battery system may experience a short or other failure on the system level, battery unit 100 level, and/or individual cell 114 level. Accordingly, the battery system may include fuses to provide overcurrent protection at each of these levels. For example, if there is a high voltage short at the battery system level, a system fuse may blow and split the voltage approximately in half (e.g., from 330 Volts to approximately 160 Volts), thereby interrupting the overcurrent. Additionally, the battery unit 100 may include fuses to isolate a failed battery unit 100 from adjacent battery units 100. Further, the battery unit 100 may include a fuse for each individual cell 114, as illustrated in FIG. 1A, to isolate failed cells from adjacent cells, wherein the fuse blows to isolate the cell when the current through the fuse exceeds a threshold discharge corresponding to one cell. For example, the fuse for each 3.25 to 3.8 Volt cell 114 may be configured to allow passage of a nominal current of approximately 6.67 Amps with a peak current discharge of approximately 16.67 Amps and to blow if the current reaches or exceeds approximately 200 Amps.

An implementation of the battery unit 100 includes one or more conducting surfaces 102. In the illustrated example, the conducting surfaces 102 are arranged in two parallel planes at either end of a stacked set of cells 114. However, the conducting surfaces 102 may be arranged in other formats. The present arrangement, however, may provide ease of assembly and module 104 and 106 replacement. In the illustrated example, representative conducting surfaces 102 on the opposite plane are depicted in dotted lines. For clarity of FIG. 1, only two of the conducting surfaces 102 on the opposite plane are shown in FIG. 1, but it should be understood that there may be a conducting surface 102 on the opposite plane corresponding to each of the conducting surfaces 102 on the plane in view.

Generally speaking, each conducting surface 102 electrically connects a plurality of cells 114 arranged in a first module 104 and a second module 106. For clarity of FIG. 1, the modules 104 and 106 are only shown with respect to one conducting surface 102; however, it should be understood that each conducting surface 102 may correspond to a first module 104 and a second module 106. The conducting surface 102 electrically inter-connects modules 104 and 106 at a positive or negative terminal (e.g., terminal 116) of the cells 114 of the respective modules 104 and 106. Stated differently, the conducting surface 102 is a common conducting plane between adjacent cells 114 whereby the voltage potential of the conducting surface 102 is substantially the same as an individual cell 114 of the modules 104 and 106. In the same arrangement, however, the modules 104 and 106 may source current about equal to the sum of the currents available from the individual cells 114. The first module 104 includes a discrete set of stacked cells 114 oriented in a first direction such that a positive terminal of each cell 114 may be electrically connected to the conducting surface 102. Each positive terminal has a positive electrical polarity. Similarly, the second module 106 includes a discrete set of stacked cells 114 oriented in a second direction such that a negative terminal 116 of each cell may be electrically connected to the conducting surface 102. Each negative terminal has a negative electrical polarity. In this respect, the conducting surface 102 provides a series connection between the modules 104 and 106.

Each of the conducting surfaces 102 may be electrically connected in series to provide higher voltage and power to the battery unit 100. In a particular example implementation, the battery unit 100 provides 36 Volts from the series connection of 10 sets of modules 104 and 106 having a plurality of cells 114 stacked in parallel, each cell 114 providing a nominal voltage of approximately 3.6 Volts. An implementation of the battery unit 100 further includes a circuit board 108, which includes conductive pathways to electrically connect the electric components of the battery unit 100. In one example, each of the conducting surfaces 102 includes a conducting tab 124 to electrically connect each conducting surface 102 to a conductive pathway on the circuit board 108, which connects the conducting surfaces 102 via the conductive pathways. The circuit board 108 may also be configured to monitor the level of power capacity or other performance characteristics of the battery unit 100 and to react to those characteristics. For example, the circuit board 108 may monitor the current output of the modules 104 and 106 during recharging and compare the measured current to a set cutoff current. If a module 104 or 106 meets or exceeds the cutoff current, the circuit board 108 may react to reduce the current output from the module 104 or 106. However, the battery unit 100 may include further mechanisms for protecting against overcurrent.

To provide overcurrent protection at the cellular level, failed cells are isolated from adjacent cells using fusible links. Each conducting surface 102 has a plurality of fuses F, which may be an integral feature of the conducting surface 102, corresponding to individual cell terminals 116 of the same polarity. In one implementation, the fuses are positioned on the conducting surface 102 relative to each of the terminals 116 having a negative polarity. For clarity of FIG. 1, the fuses F are only shown on one of the conducting surfaces 102; however, it should be understood that each of the conducting surfaces 102 may have a plurality of fuses F.

Referring to FIG. 1A, each fuse has an elongated perforation 118 defining an enclosed conducting surface 120 in electrical communication with one of terminals 116. In one implementation, the elongated perforation 118 forms a generally arced shape. More particularly, the elongated perforation 118 may define a semi-circular arc. The enclosed conducting surface 120 includes a resistive aperture 122 (fusible link). The elongated perforation 118 of each fuse focuses the current path on the conducting surface 102 to flow through the resistive aperture 122. Stated differently, the conducting pathway through the elongated perforation 118 and into the enclosed conducting surface 120 provide a fusible link between the terminal 116 of the associated cell 114 and the surrounding conducting material of the conducting surface 102 around the elongated perforation 118. As discussed herein, the resistive aperture 122 represents an aperture of conducting material from the enclosed conducting surface 120 through the elongated perforation 118 to the surrounding conducting material of the conducting surface 102. Thus, the term "resistive aperture" is used herein in conjunction with the term "fusible link," as the conducting or resistive aperture is a material link that breaks under certain current conditions.

Specifically, the resistive aperture 122 (fusible link) is configured to allow passage of nominal current up to a peak current discharge and allow excessive current for short durations. The resistance of the resistive aperture 122 generates heat due to the current flow, and as the current rises, the material of the resistive aperture 122 rises to a higher temperature. When the current flowing through the resistive aperture 122 is below the peak current discharge, the resistive aperture 122 is conductive with negligible resistance or impedance. Accordingly, the temperature of the resistive aperture 122 remains relatively low under these conditions. However, if excessive current flows through the resistive aperture 122, the resistive aperture 122 becomes increasingly resistive, and the generated heat melts the resistive aperture 122, physically separating the terminal 116 of the cell 114 from the conducting surface 102. Separating the terminal 116 of the cell 114 from the conducting surface 102 isolates the cell 114 from adjacent cells and effectively removes the cell 114 from electrical communication with the battery unit 100. In other words, current flow is concentrated into this conductive pathway in a controlled manner whereby the fusible link will fail under predictable conditions (e.g., excessively high current), thereby isolating a failed cell from other cells, etc.

In one implementation, the battery unit 100 further includes an electrical insulation layer 110, which has a plurality of holes 112. The electrical insulation layer 110 electrically insulates the conducting layer 102 from the plurality of cells 114. Each of the plurality of holes 112 are positioned relative to either a positive terminal or a negative terminal (e.g., terminal 116) of a particular cell 114. The conducting surface 102 is in electric communication with the positive and/or negative terminals at each of the holes 112. In one implementation, the enclosed conducting surface 120 of each of the fuses is in electric communication with one of the negative terminals 116 through one of the holes 112, and the electrical insulation layer 110 separates the surface area of the negative terminal 116 from the surface area of the conducting surface 102 outside the enclosed conducting surface 120. Thus, the electrical insulation layer 110 provides a barrier between the plurality of cells 114 and the conducting layer 102 except at the point of connection between a particular cell terminal 116 and the conducting surface 102. In the event a particular cell type does not have an integral raised terminal, then a conducting plate may be fabricated with a conducting bump, such as a solder ball or other mechanism to extend through the holes 112 and engage the terminal 116 of the cell 114. If there is an overcurrent and a fuse blows, the electrical insulation layer 110 prevents a failed cell from accidental electrical communication with the conducting layer 102. Specifically, even if a fuse blows removing the point of connection between the cell terminal 116 and the conducting surface 102, the surrounding conducting material of the conducting surface 102 around the elongated perforation 118 may accidentally come into contact with the cell terminal 116. Accordingly, the electrical insulation layer 110 provides a barrier between the surrounding conducting material of the conducting layer 102 from coming into electrical communication with the cell terminal 116.

Figure 2:
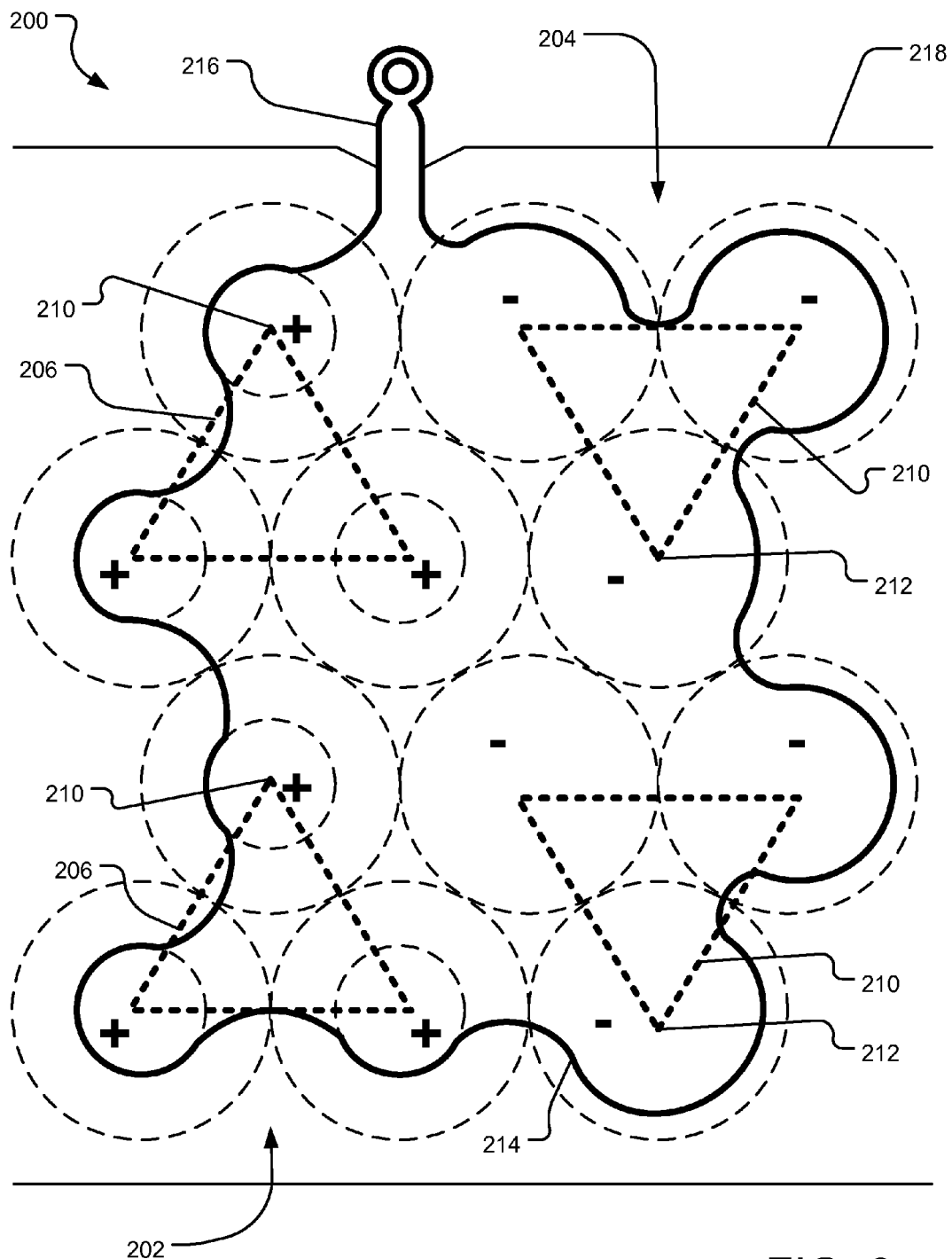
FIG. 2 illustrates a detailed view of an example battery module configuration.

FIG. 2 illustrates a detailed view of an example battery module configuration 200 having fusible links. For clarity of the illustration, the fuses are not shown in FIG. 2. However, it should be understood that the battery module configuration 200 may include one or more fuses as described herein. An implementation of the battery module configuration 200 includes a plurality of cells arranged in modules. Each of the cells has a shape, including, but not limited to, cylindrical, hexahedral, pyramidal, etc. Most commonly, the cells are each cylindrical, and when cells of the same type are used, then the cylindrical dimensions are consistent between the cells. The cells may be stacked, for example, in a vertically staggered configuration or a vertically orthogonal configuration. Further, the cells may be potted in a module. For example, the cells may be potted with a high temperature insulator (e.g., silicon). Potting the cells electrically isolates the cells and reduces vibration and overcurrent. Further, potting the cells provides an even stress distribution around the outside of the cells, which provides uniform loading to the cells. Without potting, a cell may be in physical contact with adjacent cells, which creates point loading locations. If the battery module configuration 200 experiences a shock load, the point loading may damage the cell internally, which may result in a short circuit or a failure of the cell. Potting the cells substantially eliminates point loading to the cells, thereby providing uniform loading to the cells.

In one implementation, a first module 202 comprises a first plurality of cells oriented in a first direction and a second module 204 comprises a second plurality of cells oriented in a second direction, which is different from the first direction. As shown in FIG. 2, the cells of the first module 202 are stacked in one direction such that a collection of terminals of the same polarity are adjacent, and the cells of the second module 204 are stacked in the opposite direction such that a collection of terminals of the same polarity opposite the polarity of terminals of the first module 202 are adjacent. The first module 202 is positioned relative to the second module 204. In one implementation, the first module 202 and the second module 204 each have a shape comprising a series of triangular relationships 206 and 208 with vertices 210 and 212 oriented in opposite directions. For example, in an exemplary implementation illustrated in FIG. 2, the cells in the first module 202 are arranged in a series of triangular relationships 206 having a vertex 210 oriented vertically upward, and the cells of the second module 204 are arranged in a series of triangular relationships 208 having a vertex 212 oriented vertically downward. It should be understood the terms upward and downward are used in conjunction with the orientation of FIG. 2 for illustrative purposes only and should not be used to infer such relationships or be otherwise limiting. In another implementation, the first module 202 and the second module 204 each have a shape comprising a series of rectangular relationships. However, other module configurations are contemplated. Further, additional modules may be connected to increase power and voltage.

The first plurality of cells included in the first module 202 have a corresponding first plurality of terminals with a first polarity, and the second plurality of cells included in the second module 204 have a corresponding second plurality of terminals with a second polarity, which is an opposite polarity of the first polarity. In one implementation, the first plurality of cells has a corresponding plurality of positive terminals, each having a positive electrical polarity, and the second plurality of cells has a corresponding plurality of negative terminals, each having a negative electrical polarity. An electrical connection between the positive and negative terminals represents a voltage potential of a cell or a plurality of cells. The first plurality of terminals is positioned relative to the second plurality of terminals, such that the first terminals and the second terminals may be electrically connected to a conducting surface 214. In one implementation, the first terminals and the second terminals are substantially coplanar. The coplanarity may provide ease of assembly and module replacement. However, the terminals may be arranged in other formats relative to the conducting surface 214 and adjacent terminals.

The conducting surface 214 creates an electrical connection between the first plurality of cells in the first module 202 and the second plurality of cells in the second module 204 in a serial configuration. Thus, through a plurality of conducting surfaces, a serial chain of cells may be established at a desired module voltage. Stated differently, the stacked cells alternate across the modules 202 and 204 with the conducting surface 214 electrically connecting positive and negative terminals to provide a series chain of stacked (physically parallel) cell groups. The conducting surface 214 is in electrical communication with each of the first plurality of terminals and the second plurality of terminals. The conducting surface 214 may be connected to each of the terminals through various processes, including, but not limited to, simple contact, with or without biasing pressure such as in a detent, resistance welding, soldering, and brazing. Once in electrical communication with each of the first plurality of terminals in the first module 202 and the second plurality of terminals in the second module 204, the conducting surface 214 has a first conducting surface and a second conducting surface. The first conducting surface corresponds to the first plurality of terminals, and the second conducting surface corresponds to the second plurality of terminals. Accordingly, the conducting surface 214 provides a conductive path between a portion of the conducting surface 214 in electrical communication with the first plurality of terminals (the first conducting surface) and a portion of the conducting surface 214 in electrical communication with the second plurality of terminals (the negative conducting surface). The conducting surface 214 thus, while providing a contiguous conductive surface, provides a conductive path between the first module 202 and the second module 204. The conducting surface 214 may further include a conducting tab 216 to electrically connect the conducting surface 214 to a device, such as a circuit board, that electrically connects the conducting surface 214 to other conducting surfaces and electrical components.

To isolate a failed cell from adjacent cells, the conducting surface 214 may include a plurality of fuses corresponding to terminals of the same polarity. For example, the plurality of fuses may correspond to the second plurality of terminals included in the second module 204. In a particular example, the fuses are positioned on the conducting surface 214 relative to negative terminals. The fuses may comprise an elongated perforation, enclosed conducting surface, and resistive aperture (fusible link), as described with respect to FIG. 1.

In one implementation, an electrical insulating layer 218 electrically insulates the conducting layer 214 from the cells in the first module 202 and the second module 204. The electrical insulation layer 218 may have a plurality of holes positioned relative to the first plurality of terminals and the second plurality of terminals. The conducting surface 214 is in electrical communication with each of the first plurality of terminals and the second plurality of terminals at the holes of the electrical insulation layer 218. In one implementation, the enclosed conducting surface of each of the fuses is in electric communication with one of the second plurality of terminals through one of the holes.

Figure 3:
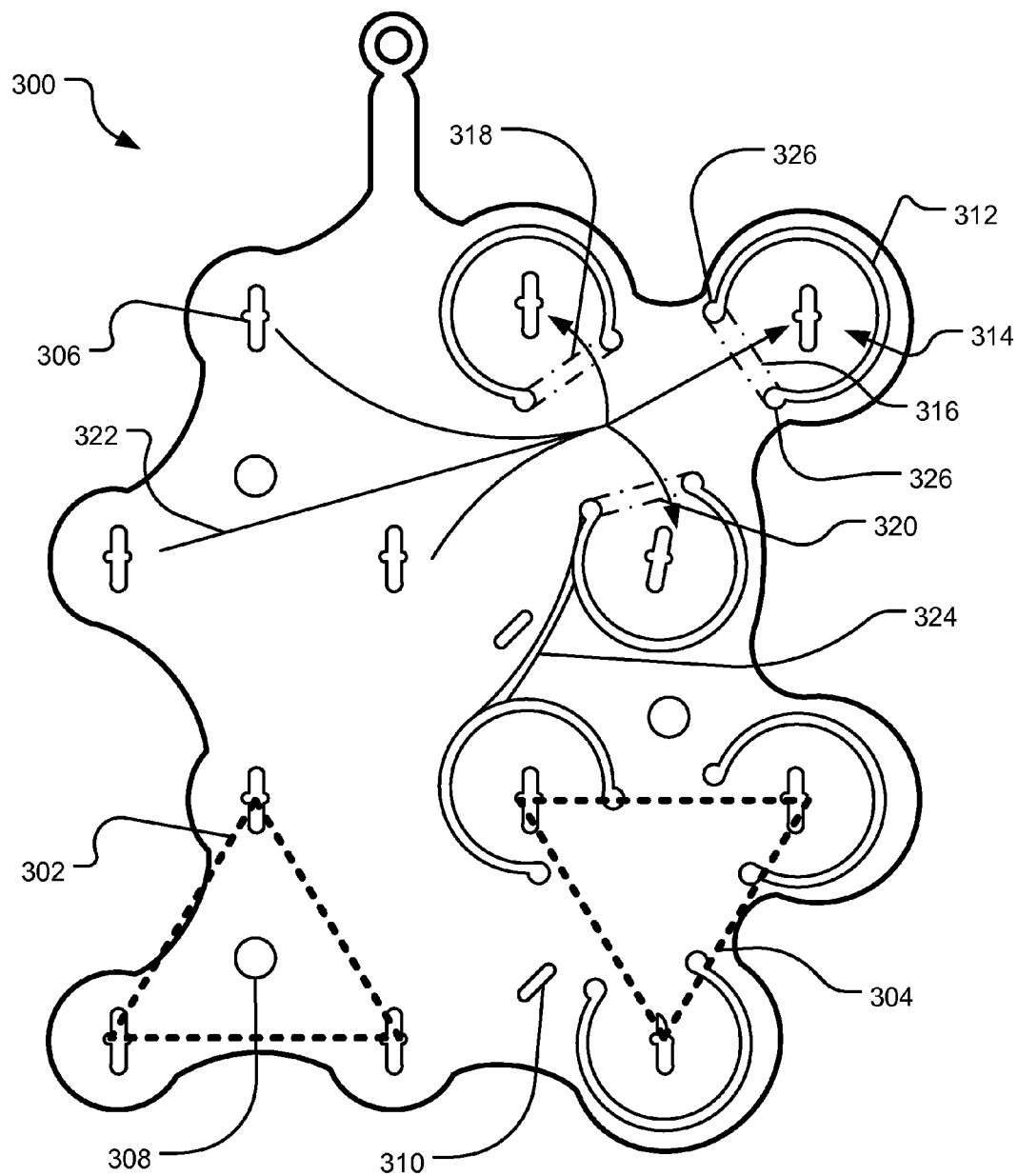
FIG. 3 illustrates a particular example of a conducting surface with an integrated fusible link configuration.

Referring now to FIG. 3, one particular example of a conducting surface 300 with an integrated fusible link configuration is illustrated. In this particular example, the conducting surface 300 electrically connects the positive terminals of six cells with the negative terminals of six adjacent cells.

The cylindrical shape of each of the cells lends itself naturally to stacking the cells in triangular relationships such that each module may be considered two sets of three cells with the terminals of each set arranged in a triangular relationship. In the particular example illustrated in FIG. 3, the positive module has six cells arranged in two positive triangular relationships, one of which is shown with dotted lines as positive triangular relationship 302. With respect to the positive terminals, the positive triangular relationship 302 is merely one way to visualize the relationships between the cells in the positive module. However, in the particular example illustrated in FIG. 3, the positive terminals are not fused, so besides the convenience of positioning the cells, the positive triangular relationship 302 is not relevant to the connection with the conducting surface 300. For example, alternatively or additionally, the conducting surface 300 may include a plurality of terminal locating perforations 306 and/or a plurality of alignment perforations 308. The terminal locating perforations 306 indicate the approximate center of a cell terminal, for example, to assist in orienting the fuses during manufacturing. Similarly, the alignment perforations 308 indicate the vacant spots between the cells, to assist in orienting the fusible links configuration during manufacturing.

With respect to the negative module, the particular example illustrated in FIG. 3 shows a fusible link configuration for six cells arranged in two negative triangular relationships, one of which is shown with dotted lines as negative triangular relationship 304. Each of the negative terminals of the cells in the negative module is associated with a fuse. Accordingly, for the negative module, the negative triangular relationships (e.g., the negative triangular relationship 304) work in conjunction with the individual fuses to provide a current path between the positive terminals and the negative terminals.

As discussed herein, each fuse may have an elongated perforation 312 defining an enclosed conducting surface 314 in electrical communication with a negative cell terminal. The elongated perforation 312 has a generally arced shape, including, but not limited to, curved, U-shaped, semi-circular, semi-elliptical, semi-rectangular, and semi-triangular. The enclosed conducting surface 314 includes a resistive aperture 316 (fusible link), as described with respect to FIG. 1. In one implementation, the resistive aperture 316 has a width ranging from approximately 4 to 4.5 mm. This width corresponds to the separation between perforation holes 326 at either end of the elongated perforation 312 that partially surrounds the negative cell terminal. However, other widths are contemplated depending on the size and type of cells used. As described herein, if excessive current flows through the resistive aperture 316, generated heat melts the resistive aperture 316 (fusible link), physically separating the enclosed conducting surface 314 from the conducting surface 300, as illustrated in FIG. 3 with broken lines.

Even if a battery system does not include a failed cell, the battery system is limited by the weakest cell in the amount of current that the battery system can supply. A battery system having cells that remain as close to equal charge as possible generally provides the best performance. Accordingly, each fusible link is oriented relative to the fusible links of at least two adjacent fuses, such that a substantially even current path is provided to each of the corresponding cell terminals. For example, the resistive aperture 316 is oriented relative to resistive apertures 318 and 320. Similarly, the fusible links in the negative triangular relationship 304 are positioned relative to each other. As shown by the example current paths 322 illustrated in FIG. 3, the current flows from the positive terminals into the negative triangular relationships, and the orientation of the fusible links provides a substantially even current path to each of the negative terminals in the negative triangular relationships. A substantially even current path taxes each of the cells generally equally, so the cells have as close to equal charge as possible. For example, in one implementation, for a battery system using cells providing 3.25 to 3.8 Volts, the resistive apertures 316, 318, and 320 may be oriented to provide a current path of approximately 6.67 Amps per cell with a peak discharge of approximately 16.67 Amps per cell. If the current reaches or exceeds the threshold discharge for one cell, the resistive aperture of that cell will blow to isolate the cell from the adjacent cells quickly. For example, once the current reaches or exceeds the threshold discharge (e.g., approximately 200 Amps), the fuse may blow in approximately 1 second.

The conducting surface 300 may further include one or more linear perforations 310 and/or a perforation bridge 324 to direct the current paths 322 through an opening in each of the negative triangular relationships. The opening of each of the negative triangular relationships faces cells in the positive module. For example, as illustrated in FIG. 3, the opening of the negative triangular relationship 304 faces the cells in the positive triangular relationship 302. The perforation bridge 324 prevents the current paths 322 from entering the negative triangular relationships outside of the openings in the negative triangular relationships. Accordingly, a substantially even current path is provided to each of the negative triangular relationships. Additionally, the perforation bridge 324 may promote fusing between the positive triangular relationships and the negative triangular relationships. In other words, the perforation bridge 324 reduces the conducting surface area of the conducting surface 300, which creates a fusing location with respect to the positive module and the negative module.

Figure 4:
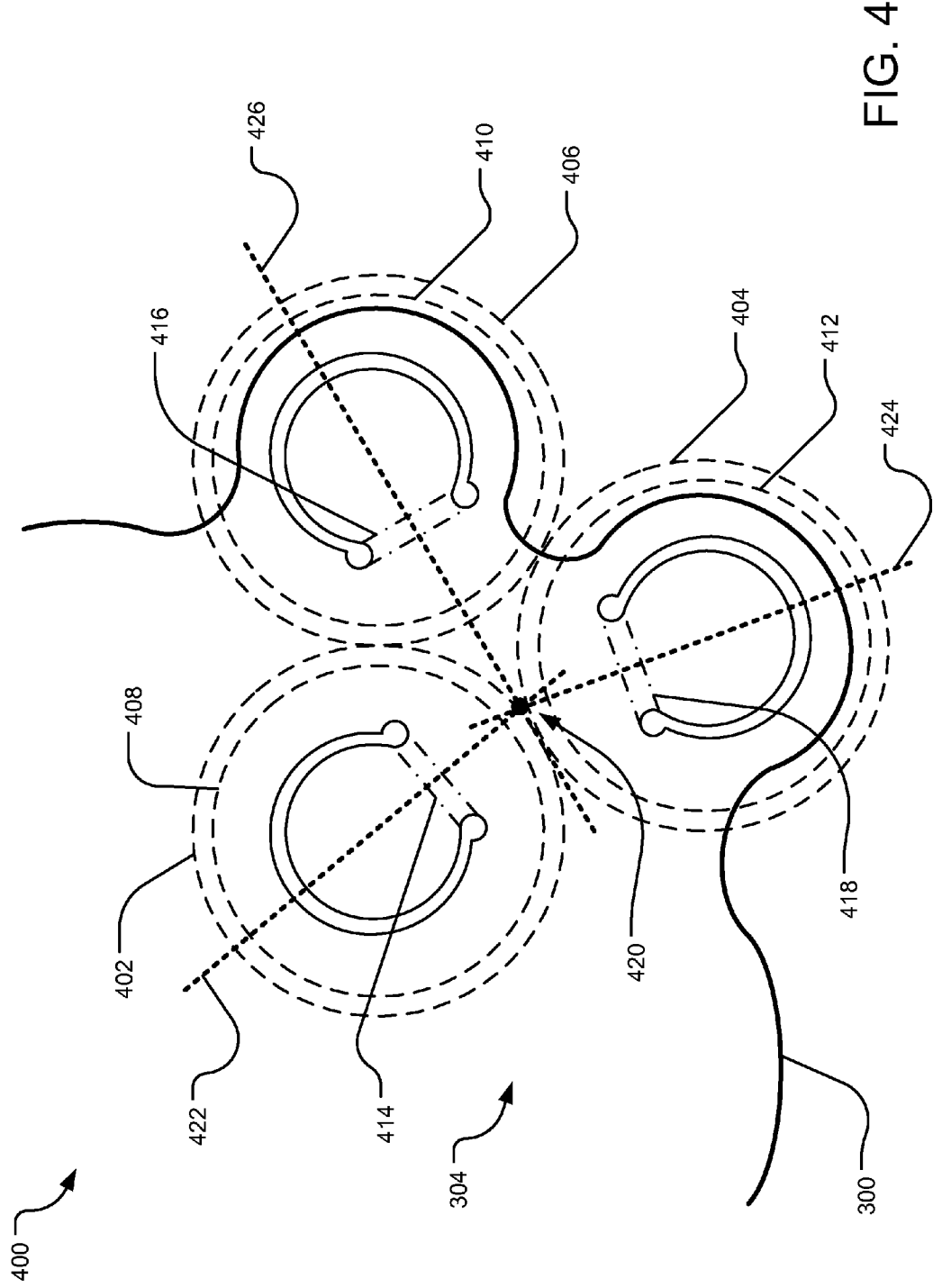
FIG. 4 illustrates a detailed view of a portion of the example fusible link configuration of FIG. 3.

FIG. 4 illustrates a detailed view 400 of a portion of the example fusible link configuration introduced in FIG. 3. Specifically, the detailed view 400 shows the negative triangular relationship 304 of FIG. 3. The negative triangular relationship 304 includes plurality of cells 402, 404, and 406, each having a first terminal 408, 410, and 412, respectively, having a first polarity. As described with respect to FIG. 3, the conducting surface 300 has a plurality of integrated fuses corresponding to the negative triangular relationship 304. Specifically, the conducting surface 300 includes a fuse positioned relative to each of the terminals 408, 410, and 412. Each of these fuses includes a resistive aperture 414, 416, and 418 (fusible link), as described with respect to FIG. 3.

In one implementation, the resistive apertures 414, 416, and 418 are oriented relative a point area 420, which is defined by lines 422, 424, and 426 emanating from the approximate center of the resistive apertures 414, 416, and 418 (fusible links), respectively. The orientation of the resistive apertures 414, 416, and 418 provides a substantially even current flow from the conducting surface 300 to each of the first terminals 408, 410, and 412. For example, a current path enters the negative triangular relationship 304 at an opening near the point area 420. Due to the positioning of the cells 402, 404, and 406 relative to the opening to the negative triangular relationship 304, the current path has a relatively shorter distance to travel to the first terminals 408 and 412 than the first terminal 410. However, the orientation of the resistive apertures 414, 416, and 418 results in a curved current path to reach the first terminals 408 and 412 and a straight current path to reach the first terminal 410, which results in a substantially even current flow to each of the first terminals 408, 410, and 412.

Figure 5:
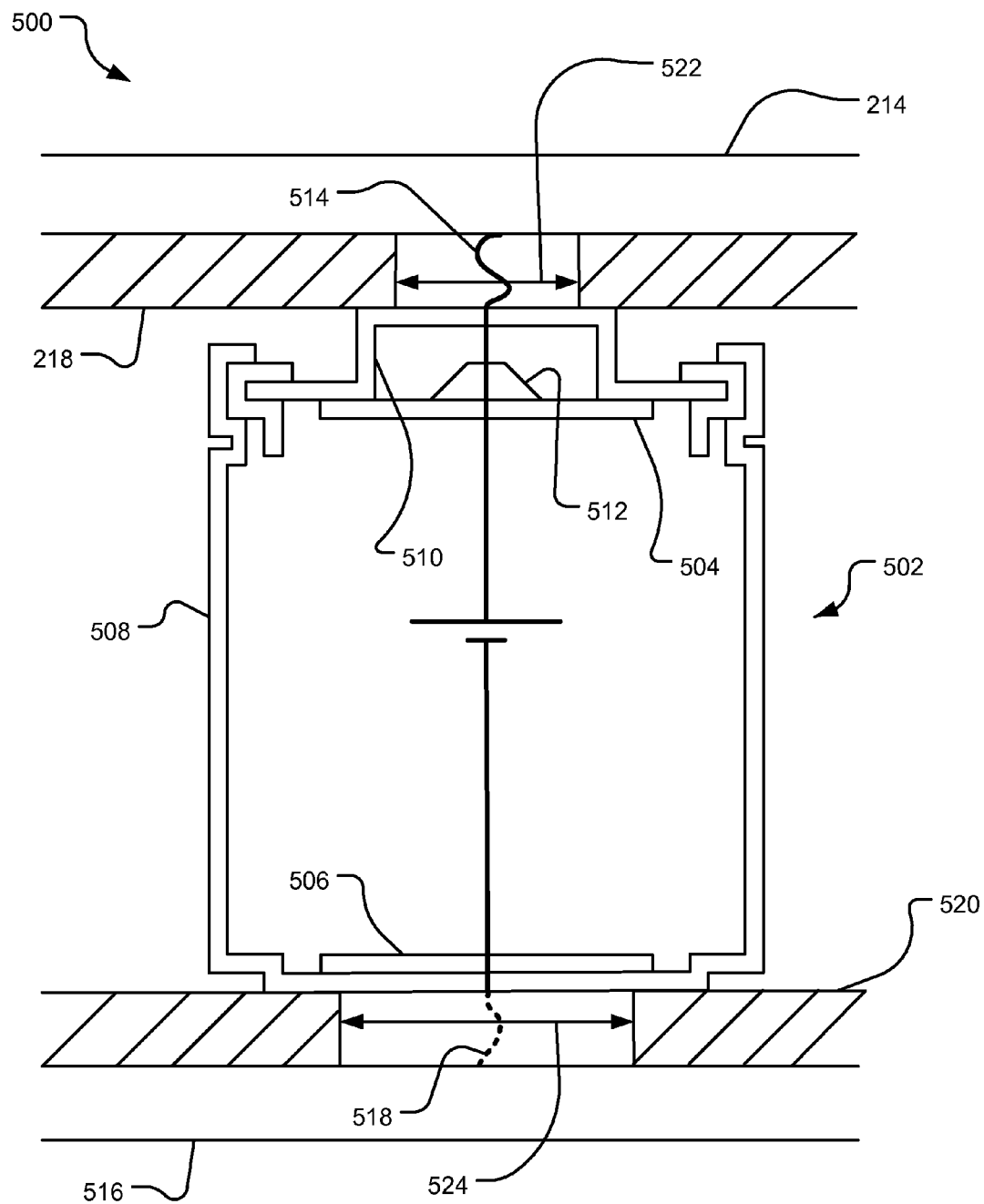
FIG. 5 illustrates a section view of the battery module configuration of FIG. 2 along the length of a cell.

FIG. 5 illustrates a section view 500 of the battery module configuration of FIG. 2 along the length of a cell. Specifically, the section view 500 shows a cell 502 in the first module 202, as shown in FIG. 2. An implementation of the battery cell 502 includes a first terminal 504 of a first polarity and a second terminal 506 of a second polarity, opposite the first polarity. For example, the first terminal 504 may be a positive terminal having a positive electrical polarity, and the second terminal 506 may be a negative terminal having a negative electrical polarity.

The battery cell includes a case 508, which may be cylindrical, hexahedral, pyramidal, etc. in shape and closed by a cap 510. The case 508 holds an electrode-wound package, including anode and cathode rolled and packed into the case 508. An electrolyte solution may also be injected into the case 508. In general, as the temperature of the battery cell 502 rises, so does the pressure inside the case 508. An internal short in the battery cell 502 may result in thermal runaway, which may increase the temperature of the battery cell 502 outside the upper limit of the functional temperature range of the battery cell 502. The functional temperature range of the battery cell 502 depends on the chemistry of the electrode-wound package, the electrolyte solution, and other chemicals contained within the case 508. For example, a practical upper limit for a Lithium Ion battery cell may be approximately 50° C.

If the temperature of the battery cell 502 exceeds the upper limit of the functional temperature range, the pressure from the high temperature may cause the battery cell 502 to burst, may create shorts, and may even cause a fire. To prevent this, the battery cell 502 may include a vent 512 to release some of the pressure in the case 508. If the pressure inside the case 508 reaches a predetermined threshold, a disk in the vent 512 mechanically ruptures and safely releases gases out of the battery cell 502, thereby decreasing the pressure. Often, the gases released are highly flammable. Accordingly, to avoid any fires or explosions, any materials that may reach a high temperature, such as the fusible links described herein, should be disposed away from the vent 512.

In one implementation, the vent 512 is disposed near the first terminal 504, which is in electrical communication with a first conducting surface, the conducting surface 214, as illustrated in FIG. 2, at a conductive link 514. The conducting surface 214 may include a perforation at the conductive link 514 that is oriented relative to the vent 512 to allow any released gases to escape safely. The second terminal 506 is in electrical communication with a second conducting surface 516 at a fusible link 518. As described with respect to FIG. 2 and elsewhere in the present disclosure, the fusible link 518 generates heat due to current flow between the second conducting surface 516 and the second terminal 506, and there is excessive current flow, the fusible link 518 will physically sever from the second conducting surface 616, illustrated in FIG. 5 by dotted lines, thereby isolating the battery cell 502.

The section view 500 further illustrates the electrical insulating layer 218 disposed between the conducting surface 214 and the battery cell 502. As described herein, the electrical insulating layer 218 may include a hole 522 positioned relative to the first terminal 504, such that the battery cell 502 is not in electrical communication with the conducting surface 214 outside the hole 522. Further, the positioning of the hole 522 allows any gases released from the vent 512 to safely escape through the electrical insulating layer 218. Similarly, a second electrical insulating layer 520 is disposed between the second conducting surface 516 and the battery cell 502. The second electrical insulating layer 520 may include a hole 524 positioned relative to the second terminal 506, such that the battery cell 502 is not in electrical communication with the second conducting surface 516 outside the hole 524.

The electrical insulating layer 218 and the second electrical insulating layer 520 may be made, for example, from mica sheets, a paraffinic polymer, and/or a thermoplastic polymer, including, but not limited to, polytetrafluoroethylene. In one implementation, the electrical insulating layer 218 and the second electrical insulating layer 520 are each approximately 0.0001 inches thick. However, other electric insulating materials and thicknesses are contemplated. Polytetrafluoroethylene is thermally conductive and resistant, as well as chemically resistant, which further protects against unsafe conditions that may result when a cell releases corrosive and flammable chemicals. The conductive surface 214 and the second conducting surface 516 may be made, for example, from electrically conductive metals and metallic alloys, including without limitation, nickel and nickel alloys. In one implementation, the conductive surface 214 and the second conducting surface 516 are each approximately 0.006 inches thick. However, other electric insulating materials and thicknesses are contemplated.

When the fusible link 518 severs, the material of the second conducting surface 516 reaches substantially high temperatures. Specifically, the molten temperature of the second conducting surface 516 is substantially higher than the melting point of the second electrical insulating layer 520. For example, nickel has a molten temperature of approximately 1,453° C. and polytetrafluoroethylene has a melting point of approximately 327° C. Thus, the melting point of polytetrafluoroethylene counsels against its use in the presently disclosed technology. However, through experimentation and research, the presently disclosed technology recognizes that when the fusible link 528 severs, the molten temperature of the second conducting surface 516 is relatively short lived such that the second electrical insulating layer 520 does not liquefy or break.

FIG. 6 illustrates an example vehicle system 600 that may be useful in implementing the presently disclosed technology. An implementation of the vehicle system 600 includes a battery 602, a motor 604, and a computer 606.

The battery 602 provides electric power to various components and devices included in the vehicle 600. In one implementation, the battery 602 includes a plurality of cells arranged in modules, which are electrically connected by a conducting surface. The battery 602 may include additional modules to provide higher voltages and power. One of the plurality of cells may fail for a variety of reasons. Failure of one cell often triggers a similar failure in adjacent cells, which may impair the operation of the battery 602 or render the vehicle 600 inoperative.

As described herein, to isolate failed cells from adjacent cells, the conducting surface has a plurality of fuses corresponding to individual cell terminals having the same polarity. Each fuse has an elongated perforation defining an enclosed conducting surface in electrical communication with one of the terminals. The enclosed conducting surface includes a resistive aperture, which generates heat due to current flow, and if excessive current flows between one of the terminals and the second conductive surface, the resistive aperture will melt, physically separating the failed cell from the second conducting surface, thereby isolating it from adjacent cells.

The motor 604 may be an electric motor that uses power from the battery 602 to propel the vehicle 600. The vehicle 600 may be a pure electric vehicle or a hybrid electric vehicle. An electric vehicle may include an inverter between the battery 602 and the motor 604 to convert DC electric power into a three-phase AC electric power to drive the motor 604. A hybrid vehicle may include an internal combustion engine or hydrogen fuel cell to supply power to a transmission to propel the vehicle 600 and to turn a generator to provide power to charge the battery 602. The computer 606 is powered by the battery 602 and controls the operation of the vehicle 600 and additional components such as an audio system, a navigation system, lighting, etc.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Embodiments of the present disclosure may be provided as a computer program product, which may include a machine-readable medium having stored thereon instructions, which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

What is claimed is:

1. A battery unit comprising:
a first plurality of cells, each cell comprising a first terminal; and
a conducting surface defining a plurality of fuses, each fuse including an elongated perforation defining an enclosed conducting surface having a resistive aperture, the enclosed conducting surface of each of the fuses being in electric communication with the first terminal of each of the cells, wherein each resistive aperture is oriented relative to a point area defined by an intersection of lines, each line emanating from the point area and intersecting at an approximate center of the elongated perforation and an approximate center of the resistive aperture of one of the fuses.

2. The battery unit of claim 1, wherein the first plurality of cells are arranged to form a first generally triangular relationship.

3. The battery unit of claim 2, further comprising:
a second plurality of cells are arranged to form a second generally triangular relationship, the second plurality of cells being oriented near the first generally triangular relationship.

4. The battery unit of claim 3, wherein the first generally triangular relationship and the second generally triangular relationship are connected by a perforation bridge.

5. The battery unit of claim 1, wherein each of the second plurality of cells comprise a second terminal, the first terminal and the second terminal having a first polarity.

6. The battery unit of claim 5, further comprising:
a third plurality of cells having a corresponding plurality of terminals having a second polarity opposite the first polarity, the plurality of terminals being oriented relative to the first terminals and second terminals.

7. The battery unit of claim 6, wherein the first polarity is a negative electrical polarity and the second polarity is a positive electrical polarity.

8. The battery unit of claim 1, wherein the first plurality of cells is potted.

* * * * *